United States Patent

Borrevang et al.

[15] 3,673,224

[45] June 27, 1972

[54] STEROID COMPOUNDS OF THE ESTRANE, ANDROSTANE, PREGNANE AND 19-NORPREGNANE SERIES AND THE PREPARATION THEREOF

[72] Inventors: Poul Borrevang, Rodovre; Peter Faarup, Soborg, both of Denmark

[73] Assignee: Novo Terapeutisk Laboratorium A/S, Copenhagen, N, Denmark

[22] Filed: Dec. 16, 1969

[21] Appl. No.: 885,654

[30] Foreign Application Priority Data

Dec. 24, 1968 Great Britain ...................... 61,413/68

[52] U.S. Cl. ..................... 260/397.4, 260/397.3, 260/397.5, 260/999
[51] Int. Cl. ....................................................... C07c 169/34
[58] Field of Search ................... Machine Searched Steroids

[56] References Cited

UNITED STATES PATENTS 2,884,416   4/1959   Babcock .............................. 260/239.5
3,136,753   6/1964   Irmscher .............................. 260/210.5

*Primary Examiner*—Henry A. French
*Attorney*—Synnestvedt & Lechner

[57] ABSTRACT

Novel and therapeutically useful steroid compounds of the estrane, androstane, pregnane or 19-norpregnane series and having the partial ring A configuration:

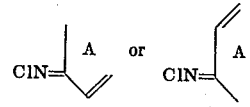

as well as processes for the preparation of these steroid compounds.

7 Claims, No Drawings

STEROID COMPOUNDS OF THE ESTRANE, ANDROSTANE, PREGNANE AND 19-NORPREGNANE SERIES AND THE PREPARATION THEREOF

The present invention relates to novel and useful steroid compounds of the estrane, androstane, pregnane or 19-norpregnane series, said compounds having the partial ring A configuration:

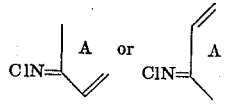

More specifically, the invention relates to novel steroid compounds of the above series having the ring A configuration:

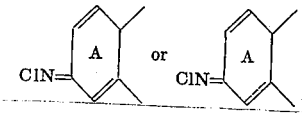

in which the dotted lines indicate the presence of an optional double bond in the 1-position and the 4-position, respectively.

The characteristic novel feature of these steroid compounds is the presence in the 3-position of a N-chloroimino group.

It has been found that the introduction of the N-chloroimino group in the 3-position does not only modify the therapeutical properties, but may also cause a material change in such properties. Furthermore, the novel steroid compounds of the invention may also be used as intermediates for producing other novel or known steroid compounds.

More specifically, the invention relates to the novel steroid compounds having the general formula:

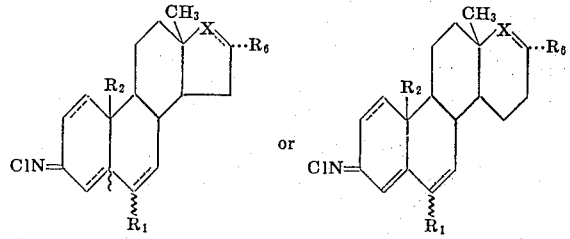

in which the dotted lines in the first formula indicate the presence of an optional double bond in the 4-, 6- and 16-position, respectively, and the dotted lines in the second formula indicate the presence of an optional double bond in the 1-, 6- and 16-position, respectively, and in which $R_1$ means hydrogen, methyl or chlorine
$R_2$ means hydrogen or methyl,

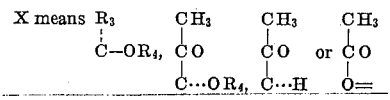

where $R_3$ means hydrogen, an alkyl group with one to six carbon atoms or an alkenyl or alkinyl group having up to five carbon atoms, and $R_4$ means hydrogen or $OCR_5$, where $R_5$ is hydrogen or an alkyl group having up to eight carbon atoms, and $R_6$ means hydrogen or alkyl having one to three carbon atoms.

Dependent on the position of the chlorine atom in the N-chloroimino group the novel steroid compounds of the invention may exist in one of two isomeric forms, viz, the anti-isomeric and syn-isomeric forms. In general no material difference in therapeutical activity between these two isomeric forms has been found.

In order to illustrate the change in the therapeutical activity caused by the introduction of the 3-N-chloroimino group reference is made to the following examples:

It is known that 17 α-acetoxy-progesterone shows a gestagenic activity by oral administration, and it has been found that this compound shows no gonadotropinic activity, i.e., neither gonadotropin inhibition nor gonadotropin releasing effect. However, when the 3keto group is substituted by a 3-N-chloroimino group the novel compound, 17 α-acetoxy-Δ⁴-pregnene-20-one-3-N-chloroimine, will show an increased gestagenic activity by oral administration and a gonadotropin releasing effect by oral administration, which means that the novel 3-N-chloroimino steroid promotes fertility.

It is also known that 6 α-methyl-17 α-acetoxy-progesterone has a gestagenic effect per os and a gonadotropin inhibition effect by subcutaneous injection, but not by oral administration. When, however, the 3-keto group in this steroid is substituted by a N-chloroimino group the novel compound, 6 α-methyl-17 α-acetoxy-Δ⁴-pregnene-20-one-3-N-chloroimine, will show gonadotropin inhibition by oral administration.

Furthermore, it is known that 6-methyl-17α-acetoxy-Δ⁶-progesterone possesses gestagenic activity and gonadotropin inhibition by oral administration. However, the corresponding 3-N-chloroimine, 6-methyl-17α-acetoxy-Δ⁴,⁶-pregnadiene-20-one-3-N-chloroimine, shows per os almost the same gestagenic activity but stronger gonadotropin inhibition.

The above illustrating examples also show that the presence of a methyl group in 6-position should in general be avoided if a gonadotropin releasing effect is desired.

Thus, in accordance with the above the invention specifically encompasses the compounds of the formula:

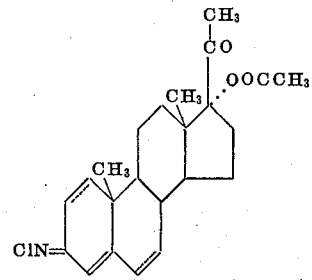

in which the dotted lines indicate the presence of an optional bond in the 1- and the 6-position, respectively, since these compounds are particularly valuable on account of their gonadotropin releasing effect.

Furthermore, in view of their gonadotropin-inhibiting activity the following compounds are also specifically encompassed by the present invention:

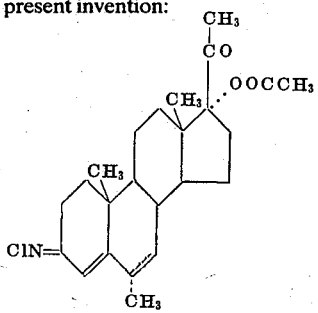

in which the dotted line indicates the presence of an optional bond in the 6-position.

Compounds particularly valuable in view of their therapeutical activities as described in the following specific examples are 17 α-acetoxy-Δ⁴-pregnene-20-one-3-N-chloroimine and 17 α-acetoxy-Δ⁴,⁶-pregnadiene-20-one-3-N-chloroimine.

In the androstane series it has been found possible to increase the therapeutical activities by introduction of the 3-N-chloroimino group when compared with the same activities of testosterone, methyltestosterone and ethisterone.

The present invention also relates to processes for producing the novel steroid compounds referred to.

According to one embodiment of the process of the invention the starting material is the 3-keto compound of the steroid to be converted into the corresponding 3-N-chloroimino derivative, the 3-keto steroid being reacted with a primary amine (RNH$_2$) to form the 3-R-imino steroid which is then reacted with ammonia and a hypochlorite or chloramine or N-chlorosuccinimide to form the 3-N-chloroimino compound.

Thus, according to the invention steroid compounds of the estrane, androstane, pregnane or 19-norpregnane series having the partial ring A configuration:

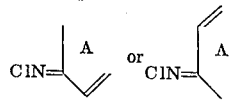

may be prepared by reacting a corresponding steroid compound of the partial ring A configuration:

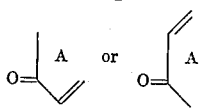

with a primary amine of the formula RNH$_2$, in which R is preferably an alkyl group, a cycloalkyl group or an aralkyl group, to form the corresponding 3-R-imino steroid which is then reacted with ammonia and a hypochlorite or chloramine or N-chlorosuccinimide, the reaction being carried out in an organic solvent, preferably also in the presence of an ammonium salt.

This process may be illustrated by the following reaction schemes:

(1a)

(1b)

(1c)

(1d)

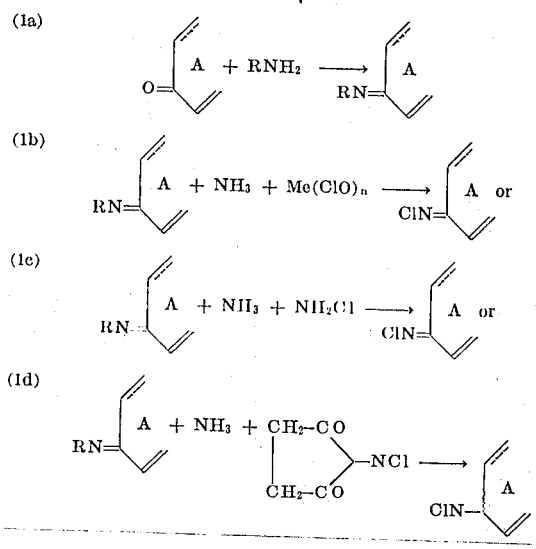

The symbol R can for instance be an alkyl group, a cycloalkyl group or an aralkyl group.

The same reaction will take place when the Δ$^4$-steroid is substituted by the corresponding Δ$^1$-steroid.

In some cases the 3-imino steroid may be isolated so that this compound may be considered the starting material. It is also possible to carry out the process in one step without the use of the amine RNH$_2$. In such case the 3-keto steroid is reacted with ammonia and a hypochlorite or N-chlorosuccinimide, but the yields are inferior unless the reaction is repeated two or three times.

The reaction mechanism is supposed to be that ammonia and hypochlorite or N-chlorosuccinimide form chloramine which reacts in statu nascendi on the 3-imino steroid formed as an intermediate from the 3-keto steroid.

Thus, according to another embodiment of the process of the invention the 3-keto steroid is reacted with ammonia and freshly prepared chloramine. Hence, the process of the invention may also be illustrated by the following reaction schemes:

(2)

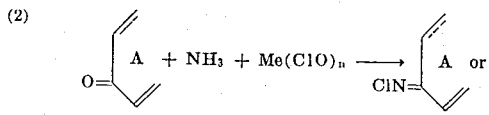

(3)

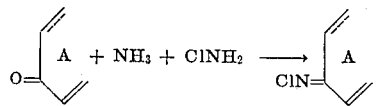

Thus, according to the invention steroid compounds of the estrane, androstane, pregnane or 19-norpregnane series having the partial ring A configuration:

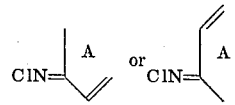

may be prepared by reacting a corresponding steroid compound of the partial ring A configuration:

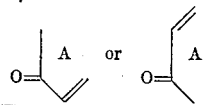

with ammonia and a hypochlorite or freshly prepared chloramine or N-chlorosuccinimide, the reaction being carried out in an organic solvent, preferably also in the presence of an ammonium salt.

When the 3-N-chloroimino group is to be introduced in steroids carrying an alkinyl group in 17 α-position it is in some cases preferred to have an esterified hydroxy group in 17 β-position in order to obtain reasonable yields.

The reaction is carried out in the presence of an organic solvent. When the hypochlorite is used in the form of an aqueous solution it is preferred to use organic solvents miscible with water. Examples of such solvents are monovalent aliphatic alcohols, mono-etherified polyvalent aliphatic alcohols, dioxane and tetrahydrofuran. However, also water-immiscible organic solvents may be used, for instance when use is made of freshly prepared chloramine dissolved in ether.

Examples of hypochlorites which may be used in the process are alkalimetal and earth alkali metal hypochlorites.

It has been found that good yields are obtained when the reaction is carried out in the presence of ammonium chloride or the ammonium salt of p-toluenesulphonic acid.

The following examples illustrate the process of the invention and some of the biological properties of the compounds produced.

EXAMPLE 1 a. 17 β-hydroxy-Δ$^4$-androstane-3-N-chloroimine 50.0 g of testosterone were dissolved in 200 ml of methanol, heated to boiling temperature and admixed with 50.0 ml of 33 percent aqueous methylamine solution whereafter the mixture was left overnight at room temperature and then in a refrigerator for some hours. The precipitate was filtered off and washed with ethyl acetate. The yield was 39.3 g of testosterone methylimine, having a melting point of 121° to 123.5° C.

The infrared spectrum (KBr) showed a band at 1643 cm$^{-1}$ (C = N).

6.0 g of the testosterone methylimine were dissolved in 300 ml of dry methanol, cooled on ice bath and admixed with 25.5 ml of 7.8 molar methanolic ammonia solution, 10.6 g of ammonium chloride and while stirring with 4.85 g of 70 percent calcium hypochlorite in small portions so that the temperature did not exceed 5° C. The mixture was stirred on ice bath for a couple of hours and then overnight at room temperature. The reaction mixture was admixed with water and extracted three times with methylene chloride. The combined organic phases were washed three times with water, dried over Na$_2$SO$_4$ and evaporated to dryness in vacuo. The residue was chromatographed over 300 g of silica gel (deactivated with 75 ml of water) and eluated with methylene chloride. Thereby were first obtained 1.3 g of the anti-isomer of 17 β-hydroxyΔ$^4$-androstene-3-N-chloroimine which was recrystallized from methanol and had a melting point of 158° to 163° C.

The infrared spectrum (KBr) showed bands at 1626 cm$^{-1}$ (C = C), 1560 cm$^{-1}$ (C = NCl) and 683 cm$^{-1}$ (NCl).

NMR: 5.97 ppm (4–H).
Analysis
Calculated for $C_{19}H_{28}ClNO$: C: 70.89% H: 8.77% N: 4.35% Cl: 11.02%
Found: C: 71.10% H: 8.94% N: 4.41% Cl: 11.06%

Further elution resulted in 2.0 g of the syn-isomeric form.
After recrystallization from methanol the melting point was 140° to 145° C.

The infrared spectrum (KBr) showed bands at 1612 cm$^{-1}$ (C=C), 1570 cm$^{-1}$ (C = NCl) and 682 cm$^{-1}$ (NCl).
NMR: 6.50 ppm (4–H).
Analysis
Found: C: 70.55% H: 8.69% N: 4.34% Cl: 11.09%
Biology In the tests used there did not seem to be any biological difference between the syn- and the anti-forms. By subcutaneous injection they proved to have a somewhat stronger myotrophical and androgenic effect than has testosterone.

b. 17 β-acetoxy-Δ$^4$-androstene-3-N-chloroimine 1.0 g of the anti-isomeric form of 17 β-hydroxy-Δ$^4$-androstene-3-N-chloroimine was dissolved in a mixture of 5.0 ml of acetic anhydride and 10.0 ml of pyridine. The mixture was left overnight at room temperature, then admixed with ether and shaken twice with sodium bicarbonate solution and once with water, dried over $Na_2SO_4$ and evaporated to dryness in vacuo. The residue crystallized with methanol. The yield was 0.88 g of the anti-isomeric form of 17 β-acetoxy-Δ$^4$-androstene-3-N-chloroimine, having a melting point of 120° to 125° C.

The infrared spectrum (KBr) showed bands at 1,730 cm$^{-1}$ (C = O), 1242 cm$^{-1}$ (CO—O—), 1623 cm$^{-1}$ (C = C), 1557 cm$^{-1}$ (C = NCl) and 684 cm$^{-1}$ (NCl).
Analysis:
Calculated for $C_{21}H_{30}ClNO_2$: N: 3.85% Cl: 9.74%
Found: N: 3.79% Cl: 9.65%

1.0 g of the syn-isomeric form of 17 β-hydroxy-Δ$^4$-androstene-3-N-chloroimine was acetylated in the same manner as the anti-isomeric form thereof. After crystallization with methanol 0.82 g of the syn-isomeric form of 17 β-acetoxy-Δ$^4$-androstene-3-N-chloroimine was obtained having a melting point of 165° to 168° C.

The infrared spectrum (KBr) showed bands at 1,730 cm$^{-1}$ (C= O), 1242 cm$^{-1}$ (CO—O—), 1616 cm$^{-1}$ (C = C), 1574 cm$^{-1}$ (C:NCl) and 674 cm$^{-1}$ (NCl).

EXAMPLE 2

17 β-hydroxy-Δ$^{1,4}$-androstadiene-3-N-chloroimine.

10.0 g of Δ$^1$-testosterone were dissolved in 500 ml of 2 molar methanolic methylamine, refluxed for 3 hours and evaporated to dryness in vacuo. The residue was dissolved in 500 ml of dry methanol, cooled on ice bath and admixed with 43.0 ml of 7.8 molar methanolic ammonia solution, 19.6 g of ammonium chloride and while stirring with 16.8 g of 70 percent calcium hypochlorite in small portions so that the temperature did not exceed 5° C. The mixture was stirred on ice bath for a couple of hours and then overnight at room temperature. The reaction mixture was admixed with water and extracted three times with methylene chloride. The combined organic phases were washed three times with water, dried over $Na_2SO_4$ and evaporated to dryness in vacuo. The residue was chromatographed on 500 g of silica gel deactivated with 20 percent water. After elution with methylene chloride there were first collected 2.85 g of the anti-isomeric form of 17 β-hydroxy-Δ$^{1,4}$-androstadiene-3-N-chloroimine which upon recrystallization from ethanol had a melting point of 147° to 149° C.

The infrared spectrum (KBr) showed bands at 1,654 cm$^{-1}$ (C = C), 1602 cm$^{-1}$ (C = C), 1535 cm$^{-1}$ (C = NCl) and 680 cm$^{-1}$ (NCl).
NMR: 6.13 ppm (4–H).
Analysis:
Calculated for $C_{19}H_{26}ClNO$: C:71.34% H:8.19% N:4.38% Cl:11.08%
Found: C:70.82% H:8.28% N:4.34% Cl:10.58%

Further elution with methylene chloride resulted in 0.35 g of a mixture of the two isomeric chloromines whereafter there were obtained 3.67 g of the syn-isomeric form of 17 β-hydroxy-Δ$^{1,4}$-androstadiene-3-N-chloroimine which upon recrystallization from ethanol had a melting point of 80° to 84° C.

The infrared spectrum (KBr) showed bands at 1,650 cm$^{-1}$ (C = C), 1597 cm$^{-1}$ (C = C), 1535 cm$^{-1}$ (C = NCl) and 672 cm$^{-1}$ (NCl).

In the NMR spectrum a chemical shifting took place of the 4-proton from 6.13 ppm in the anti-isomeric form into 6.44 ppm or 6.77 ppm in the syn-isomeric form.
Analysis:
Found: C: 70.80% H: 8.11% N: 4.29% Cl:11.08%

EXAMPLE 3

17 β-acetoxy-5 α-Δ$^1$-androstene-3-N-chloroimine 15.0 g of 17 β-hydroxy-5 α-Δ$^1$-androstene-3-one were dissolved in 300 ml of dry toluene, admixed with 60.0 ml of freshly distilled cyclohexylamine and refluxed for 18 hours while continuously separating off the water which had formed. Then the mixture was cooled and shaken three times with water, dried over $Na_2SO_4$ and evaporated to dryness in vacuo. The residue crystallized with ethylacetate whereby 13.0 g of the 3-cyclohexylimino compound formed were obtained.

18.0 g of the cyclohexylimino compound were dissolved in 875 ml of dry methanol. The solution was cooled on ice bath, admixed with 35.0 ml of 6.1 molar methanolic ammonia solution and then with 1050 ml of a 0.19 molar solution of chloramine in ether. After stirring overnight which caused the temperature to increase to room temperature, water was added. The organic phase was separated off and the aqueous phase shaken twice with ether. The combined ether phases were washed three times with $H_2O$, dried over $Na_2SO_4$ and evaporated to dryness in vacuo. The residue was admixed with a mixture of 54 ml of pyridine and 54 ml of acetic anhydride. After standing overnight at room temperature there was evaporated to dryness in vacuo. The residue was chromatographed on silica gel deactivated with 25 percent water and eluated with benzene. After evaporation of the benzene and crystallization with methanol 2.2 g of the anti-isomeric form of 17β-acetoxy-5α-Δ$^1$-androstene-3-N-chloroimine with a melting point of 153° to 155° C were obtained.
Analysis:
Calculated for $C_{21}H_{30}ClNO_2$: C:69.31% H:8.31% N:3.85% Cl:9.74%
Found: C:69.20% H:8.42% N:3.78% Cl:10.20%
and 1.2 g of the syn-isomeric form having a melting point of 123° to 129° C.
Analysis:
Found: C: 69.20% H: 8.48% N: 3.81% Cl: 9.71%
Biology:
Both forms were in possession of a strong anti-estogenic effect.

EXAMPLE 4

17 α-methyl-17 β-hydroxy-Δ$^4$-androstene-3-N-chloroimine.

15.0 g of 17 α-methyltestosterone were dissolved in a mixture of 150 ml of methanol and 220 ml of 5.8 molar methanolic methylamine solution. After refluxing overnight there was evaporated to dryness. From the residue there were obtained after crystallization with ether 13.2 g of the methylimine. The said 13.2 g were dissolved in 530 ml of methanol, admixed with 23.2 g of ammonium chloride and 32.6 ml of 6.9 molar methanolic ammonia solution. At a moderate speed there were added 104.0 ml of an aqueous 3.9 normal sodium hypochlorite solution. After stirring overnight there was evaporated to dryness in vacuo. The residue was dissolved in methylene chloride, washed three times with water, dried over $Na_2SO_4$ and evaporated to dryness in vacuo. From said residue crystallized upon addition of ethylacetate 2.3 g of the syn-isomeric form of 17 α-methyl-17 β-hydroxy-Δ$^4$-androstene-3-N-chloroimine which upon recrystallization from ethyl acetate had a melting point of 151° to 153° C (decomposed). U.V. absorption:λmax. 248 mμ ε = 19900.

Analysis:
Calculated for $C_{20}H_{30}ClNO$: C:71.51% H:9.00% N:4.17% Cl:1056%
Found: C:71.68% H:8.98% N:4.11% Cl:10.55%

From the mother liquor there were obtained 3.0 g of the anti-isomeric form which upon recrystallization from methanol had a melting point of 95° to 98° C.
U.V. absorption: λ max. 246 mμ ε: 18100.
Analysis:
Calculated for $C_{20}H_{30}ClNO, CH_3OH$: C:68.54% H:9.31% N:3.81% Cl:9.64%
Found: C:68.61% H:9.17% N:3.96% Cl:9.56%

The N-chloroimine may also be produced by dissolving the 17 α-methyltestosterone directly in methanol and admixing in the same manner as described above ammonium chloride, methanolic ammonia solution and sodiumhypochlorite solution. It has, however, proved necessary in order to achieve an acceptable yield to repeat the reaction a few times after the first evaporation. After treatment for the last time with sodiumhypochlorite solution, evaporation to dryness, dissolution in methylene chloride, washing out, drying and evaporation the residue was chromatographed on silica gel (deactivated with 5 percent water) while using methylene chloride. Upon evaporation and crystallization with ethylacetate there were obtained from 15.0 g of 17 α-methyltestosterone 6.9 g which upon recrystallization from ethylacetate gave 2.3 g of the syn-isomeric form and 3.6 g of the anti-isomeric form.

Biology
There did not seem to be any biological difference between the syn-and the anti-forms. By oral administration a stronger effect was achieved (approx. twice) both myotropic and androgenic than that of the reference substance methyltestosterone.

EXAMPLE 5

17 α-methyl-17 β-hydroxy-$\Delta^{1,4}$-androstadiene-3-N-chloroimine.

10.0 g of 17 α-methyl-$\Delta^1$-testosterone were treated as described in Example 2 while using 500 ml of 2 molar methanolic methylamino solution, 500 ml of dry methanol, 41.0 ml of a 7.8 molar methanolic ammonia solution, 17.0 g of ammonium chloride and 16.3 g of 70 percent calcium-hypochlorite.

Upon chromatography which was also carried out as described in Example 2, there were first obtained 3.3 g of the anti-isomeric form of the 17 α-methyl-17 β-hydroxy-$\Delta^{1,4}$-androstadiene-3-N-chloroimine which after recrystallization from ethylacetate had a melting point of 143° to 146° C.
The infrared spectrum (KBr) showed bands at 1,646 cm$^{-1}$ (C = C), 1602 cm$^{-1}$ (C = C), 1532 cm$^{-1}$ (C = NCl) and 674 cm$^{-1}$ (NCl)
Analysis
Calculated for $C_{20}H_{28}ClNO$: C:71.94% H:8.45% N:4.20% Cl:10.62%
Found: N:4.32% Cl:10.42%

After additional evaluation there were obtained 6.0 g of a mixture of almost equal parts of the two isomeric forms with a melting point of 144° to 147° C.
Analysis
Found: C: 71.83% H: 8.43% N: 4.22% Cl:10.93%
Biology
By oral administration the anti-form showed a weak androgenic effect and some myotropic effect.

EXAMPLE 6

17 α-ethinyl-17β-hydroxy-$\Delta^4$-androstene-3-N-chloroimine.

15.0 g of ethisterone were admixed with 150 ml of methanol and 250 ml of a 5.2 molar methanolic methylamine solution. After refluxing overnight there was evaporated to dryness The solid residue was admixed with ether and was filtered off. In this manner there were obtained 14.9 g of the 3-methylimine compound having a melting point of 176° to 178° C.

The 14.9 g of the said substance were then treated as described in Example 4 while using 575 ml of methanol, 25.2 g of ammonium chloride, 47.0 ml of a 5.2 molar methanolic ammonia solution and 121.0 ml of an aqueous 3.6 normal sodiumhypochlorite solution.

The residue after the last evaporation was chromatographed on silica gel (deactivated with 5 percent water), while using methylene chloride. After evaporation the residue crystallized by addition of ether and in this manner there were obtained 4.6 g having a melting point of 145° to 147° C. By adding n-hexane there were obtained from the mother liquor additional 3.7 g which had a melting point of 142° to 147° C. These two portions were recrystallized jointly from 80 percent methanol, whereby there were obtained 5.8 g of a mixture of the syn- and the anti-isomeric forms of the 17 α-ethinyl-17β-hydroxy-$\Delta^4$-androstene-3-N-chloroimine with a melting point of 150° to 154° C. (decomposed).
Analysis
Calculated for $C_{21}H_{28}ClNO$: C:72.91% H:8.16% N:4.05% Cl10.25%
Found: C:72.65% H:8.01% N:3.85% Cl:10.33%
Biology
The said 3-N-chloroimino compound (syn- and anti-forms) was found to possess a stronger gestagenic effect by oral administration than has ethisterone. Moreover, a post-coital antifertility effect was found on rats by subcutaneous injection of a dose of 1 mg/rat/day for a period of 3 days. None of the rats became pregnant.

EXAMPLE 7

17α-ethinyl-17β-acetoxy-$\Delta^4$-estrene-3-N-chloroimine.

10.0 g of 19-norethisterone acetate were treated as described in Example 2, while using 350 ml of a 1 molar methanolic methylamine solution, 2300 ml of dry methanol, 60.5 ml of a 4.7 molar methanolic ammonia solution, 53.5 g of the ammonium salt of p-toluene sulfonic acid (instead of ammonium chloride) and 14.5 g of 70 percent calcium hypochlorite. In the chromatography use was made of benzene as eluation agent.

The yield was 2.2 g of a mixture of the syn- and the anti-isomeric forms of 17α-ethinyl-17β-acetoxy-$\Delta^4$-estrene-3-N-chloroimine which upon recrystallization from methanol had a melting point of 145° to 150° C.

The infrared spectrum (KBr) showed bands at 1,624 cm$^{-1}$ (C = C), 1613 cm$^{-1}$ (C = C), 1567 cm$^{-1}$ (C = NCl), 1557 cm$^{-1}$ (C = NCl), 673 cm$^{-1}$ (NCl) and 681 cm$^{-1}$ (NCl).
Analysis
Calculated for $C_{22}H_{28}ClNO_2$: C:70.66% H:7.55% N:3.75% O:8.56% Cl:9.48%
Found: C:70.40% H:7.50% N:3.69% O:8.58% Cl:9.44%

EXAMPLE 8

17α-acetoxy-$\Delta^4$-pregnene-20-one-3-N-chloroimine 30.0 g of 17α-acetoxyprogesterone were dissolved in 600 ml of a 3.7 molar methanolic methylamine solution and refluxed for 2 hours and a half. Then there was evaporated to dryness in vacuo, and the residue was dissolved in 1,200 ml of methanol. The said solution was cooled on ice bath and admixed with 107.0 ml of a 7.5 molar methanolic ammonia solution, 152.0 g of the ammonium salt of p-toluenesulfonic acid and while stirring with 110.0 ml of a 3.7 normal aqueous sodiumhypochlorite solution (54.0 g of N-chlorosuccinimide may be used instead) so that the temperature did not exceed 5° C. After a couple of hours at ice bath temperature stirring was continued overnight at room temperature whereafter water was added and the mixture was washed three times with methylene chloride. The combined organic phases were washed three times with water, dried over $Na_2SO_4$ and evaporated to dryness in vacuo.

The residue was chromatographed on 900 g of silica gel which had been deactivated with 20 percent water, use being made of benzene as eluation agent.

Upon evaporation of the benzene the residue crystallized with methanol, and in this manner there were obtained 14.8 g of a mixture of the syn- and the anti-isomeric forms of 17α-acetoxy-$\Delta^4$-pregnene-20-one-3-N-chloroimine with a melting point of 160° to 164° C.

The infrared spectrum (KBr) showed bands at 1,615 cm$^{-1}$ (C = C), 1558 cm$^{-1}$ (C = NCl) and 680 cm$^{-1}$ (NCl).

Upon recrystallization from methanol the following analysis was obtained:
Analysis
Calculated for $C_{23}H_{32}ClNO_3$: C:68.20% H:7.91% N:3.45% O:11.72% Cl:8.72%
Found: C:68.10% H:8.12% N:3.44% O:12.17% Cl:8.92%

By repeated chromatography on silica gel it was possible to separate the two isomeric forms.

Thereby first the anti-isomeric form was obtained.

The infrared spectrum (KBr) showed bands at 1,619 cm$^{-1}$ (C = C), 1556 cm$^{-1}$ (C = NCl) and 686 cm$^{-1}$ (NCl).
NMR: 5.95 ppm (4–H).
Melting point: 168° to 171° C (decomposed).

Thereafter the syn-isomeric form was obtained.

The infrared spectrum (KBr) showed bands at 1602 cm$^{-1}$ (C = C), 1555 cm$^{-1}$ (C = NCl) and 672 cm$^{-1}$ NCl).
NMR: 6.49 ppm (4–H).
Melting point: 178° to 181° C (decomposed).
Biology In the tests used there was found no material biological difference between the two isomeric forms. They showed by oral administration a gestagenic effect which is two to four times stronger than that of 17α-acetoxyprogesterone. In a gonadotropin test (parabiotic rats) there was found a clear increase of the weight of the ovaries after oral administration when compared with control animals or 17α-acetoxyprogesterone treated animals, which is indicative of a gonadotropin releasing effect.

The anti-form seems to have a somewhat stronger effect than has the syn-form.

EXAMPLE 9

6 α -methyl-17α-acetoxy-$\Delta^4$-pregnene-20-one-3-N-chloroimine 20.0 g of 6α-methyl-17α-acetoxy-progesterone were treated as described in Example 8, while using 700 ml of a 1.2 molar methanolic methylamine solution, 1,000 ml of dry methanol, 71.0 ml of a 7.3 molar methanolic ammonia solution, 97.5 g of the ammonium salt of p-toluenesulfonic acid and 26.0 g of 70 percent calciumhypochlorite (instead of sodiumhypochlorite solution).

The residue was chromatographed on 1,100 g of silica gel (deactivated with 20 percent water), while using benzene as eluation agent at first and thereafter benzene with 5 percent ethylacetate.

Thereby were first obtained 4.0 g of the anti-isomeric form of 6α-methyl-17α-acetoxy-$\Delta^4$-pregnene-20-one-3-N-chloroimine which upon recrystallization from methanol had a melting point of 177° to 178° C (decomposed).

The infrared spectrum (KBr) showed bands at 1,614 cm$^{-1}$ (C = C), 1557 cm$^{-1}$ (C = NCl) and 678 cm$^{-1}$ NCl).
NMR: 6.07 ppm (4–H).
Analysis
Calculated for $C_{24}H_{34}NClO_3$: C:68.63% H:8.16% N:3.34% Cl8.44%
Found: C:68.57% H:7.91% N:3.29% Cl:1:8.48%

Additional eluation resulted in 3.7 g of a mixture of the two isomeric forms and then in 2.0 g of the pure synisomeric form. After recrystallization from methanol the melting point was 183° to 184° C (decomposed).

The infrared spectrum (KBr) showed bands at 1,606 cm$^{-1}$ (C = C), 1558 cm$^{-1}$ (C = NCl) and 679 cm$^{-1}$ NCl),
NMR: 6.54 ppm (4-H).
Analysis
Found: C: 68.62% H: 8.01% N: 3.19% Cl: 8.40 % 8.40%
Biology In the tests used there did not seem to be any biological difference between the two isomeric forms.

In the gonadotropin test on parabiotic rats there was found to be a gonadotropin inhibiting effect by oral administration in contradistinction to what is the case with 6α-methyl-17α-acetoxyprogesterone.

EXAMPLE 10

6-methyl-17α-acetoxy-$\Delta^{4,6}$-pregnadiene-20-one-3-N-chloroimine 20.0 g of 6-methyl-17α-acetoxy-$\Delta^{4,6}$-pregnadiene-3,20-dione (megestrolacetate) were treated as described in Example 8, while using 700 ml of a 2.3 molar methanolic methylamine solution, 1,000 ml of methanol, 100.0 ml of a 5.2 molar methanolic ammonia solution, 98.0 g of the ammonium salt of p-toluene sulfonic acid and a solution of 26.0 g of 71 percent calciumhypochlorite in 90 ml of water (instead of sodiumhypochlorite solution).

The residue was chromatographed as described in Example 9.

Thereby were first obtained 5.6 g of the anti-isomeric form of 6-methyl-17α-acetoxy-$\Delta^{4,6}$-pregnadiene-20-one-3-N-chloroimine with a melting point of 121° to 127° C after recrystallization from ethylacetate.

The infrared spectrum (KBr) showed bands at 1,623 cm$^{-1}$ and 1,584 cm$^{-1}$ (C = C),1548 cm$^{-1}$ (C = NCl) and 684 cm$^{-1}$ (NCl).
NMR: 6.20 ppm (4-H).

After additional elevation there were thereafter obtained 5.15 g of a mixture of the two isomeric forms and then 1.85 g of the pure syn-isomeric form which after recrystallization from ethanol had a melting point of 198° to 199° C (decomposed, quick heating).

The infrared spectrum (KBr) showed bands at 1,621 cm$^{-1}$ and 1,582 cm$^{-1}$ (C = C), 1544 cm$^{-1}$ (C = NCl) and 682 cm$^{-1}$ (NCl).
NMR: 6.73 ppm (4-H).
Analysis
Calculated for $C_{24}H_{32}ClNO_3$: C:68.97% H:7.72% N:3.35% Cl:8.48%
Found: C:68.73% H:7.43% N:3.13% Cl:8.76%

It is, however, also possible to prepare the N-chloroimine directly from the megestrolacetate in the same manner as described in Example 4 for 17α-methyltestosterone. To 2.6 g of megestrolacetate were used 125 ml of methanol, 3.6 g of ammonium chloride, 6.2 ml of a 5.7 molar methanolic ammonia solution and 19.2 ml of a 3.6 normal aqueous sodiumhypochlorite solution.
Biology In the tests used there did not seem to be any biological difference between the two forms. In gonadotropin test on parabiotic rats the substances showed by oral administration a gonadotropin inhibiting effect which is stronger than that of megestrolacetate.

EXAMPLE 11

6α,16α-dimethyl-$\Delta^4$-pregnene-20-one-3-N-chloroimine 7.0 g of 6α,16α-dimethylprogesterone were dissolved in 500 ml of dry benzene, admixed with 52.0 ml of cyclohexylamine and then refluxed for 18 hours while continuously draining out the water which had formed.

Then there was evaporated to dryness in vacuo and the residue was dried in a desiccator.

By the addition of ether, the residue crystallized and 2.7 g of 6α,16α-dimethyl-$\Delta^4$-pregnene-20-one-3-cyclohexylimine were obtained.

The infrared spectrum (KBr) showed a band at 1,621 cm$^{-1}$ (C = N).

2.5 g of said imine were treated as described in Examples 2 and 7, while using 125 ml of dry methanol, 9.35 ml of a 6.3 molar methanolic ammonia solution, 11.15 g of the ammonium salt of p-toluene sulfonic acid and 3.15 g of 70 percent calciumhypochlorite.

The residue was chromatographed on 200 g of silica gel (deactivated with 20 percent water), benzene being used as eluation agent. Thereby the two isomeric forms of 6α,16α-dimethyl-Δ⁴-pregnene-20-one-3-N-chloroimine were obtained. One of the isomeric forms was obtained in an amount of 0.32 g having a melting point of 134° to 136° C and showing in the infrared spectrum (KBr) bands at 1,603 cm⁻¹ (C = C), 1,558 cm⁻¹ C = NCl) and 683 cm⁻¹ (NCl), while the other isomeric form was obtained in an amount of 0.27 g having a melting point of 124° to 127° C and showing in the infrared spectrum (KBr) bands at 1,616 cm⁻¹ (C = C), 1563 cm⁻¹ (C = NCl) and 680 cm⁻¹ (NCl).

Analysis

Calculated for $C_{23}H_{34}NClO$: C:73.47% H:9.12% N:3.73% Cl:9.43%

Found: C:73.36% H:8.94% N:3.59% Cl:9.71%

Biology

The two substances were in possession of a vigorous anti-estrogenic effect both by subcutaneous and oral administration.

EXAMPLE 12

6-chloro-17α-acetoxy-Δ⁴,⁶-pregnadiene-20-one-3-N-chloroimine 7.0 of 6-chloro-17α-acetoxy-Δ⁴,⁶-pregnadiene-3.2o-dione (chlormadinone) were dissolved in a mixture of 75.0 ml of dry methanol and 150.0 ml of a 5.0 molar methanolic methylamine solution and treated as described in Examples 8 and 9, while using 400 ml of dry methanol, 28.0 ml of a 6.0 molar methanolic ammonia solution, 31.6 g of the ammonium salt of p-toluene sulfonic acid and 8.6 g of 70 percent calciumhypochlorite solution.

The residue was chromatographed using 500 g of silica gel (deactivated) and benzene as eluation agent.

Upon evaporation of the benzene and crystallization of the residue from hexane/ethylacetate there were obtained 0.57 g of the anti-isomeric form of 6-chloro-17α-acetoxy-Δ⁴,⁶-pregnadiene-20-one-3-N-chloroimine with a melting point of 181° to 186° C.

The infrared spectrum (KBr) showed bands at 1,603 cm⁻¹ and 1,590 cm⁻¹ (C = C), 1,551 cm⁻¹ (C = NCl) and 686 cm⁻¹ (NCl).

Analysis

Calculated for $C_{23}H_{29}Cl_2NO_3$: C: 63.01% H 6.67% N; 3.19% O: 10.95% Cl:16.18%

Found: C: 62.79% H: 6.59% N: 3.21% O: 10.76% cl:15.88%

Upon further eluation with benzene a mixture of the two isomeric forms were obtained and thereafter 0.57 g of the syn-isomeric form with a melting point of 193° to 197° C.

The infrared spectrum (KBr) showed bands at 1,603 cm⁻¹ and 1,584 cm⁻¹ (C = C), 1,537 cm⁻¹ (C=NCl) and 684 cm⁻¹ (NCl)

Analysis

Found: C: 63.08% H: 6.63% N: 3.28% O: 11.19% Cl: 16.07%

Biology

The compounds showed a strong gestagenic effect by oral administration.

EXAMPLE 13

17α-acetoxy-Δ⁴,⁶-pregnadiene-20-one-3-N-chloroimine 20.0 g of 6-dehydro-17α-acetoxy-progesterone were dissolved in a mixture of 500 ml of dry methanol and 85.0 ml of a 5.0 molar methanolic methylamine solution and refluxed slightly for 2.5 hours. The resulting mixture was evaporated to dryness in vacuo and the residue was crystallized with ethanol. In this manner there were obtained 13.8 g of 17α-acetoxy-Δ⁴,⁶-pregnadiene-20-one-3-methylimine with a melting point of 146° to 149° C.

The infrared spectrum (KBr) showed a band at 1,606 cm⁻¹ (C = N and C = C).

Analysis

Calculated for $C_{24}H_{35}NO_3$: N: 3.65%

Found: N: 3.55%

From the mother liquor a further 2.2 g of the methylimino compound could be obtained.

12.0 g of the methylimino compound were treated as described in Examples 8 and 9 using 1,500 ml of dry methanol, 35.0 ml of a 9.0 molar methanolic ammonia solution, 59.0 g of the ammonium salt of p-toluenesulfonic acid and 16.0 g of 70 percent calciumhypochlorite solution.

The residue was chromatographed on 600 g of silica gel (deactivated), using benzene as eluation agent.

Upon evaporation of the benzene and crystallization of the residue from methanol there were obtained 3.6 g of the anti-isomeric form of 17α-acetoxy-Δ⁴,⁶-pregnadiene-20-one-3-N-chloroimine with a melting point of 190° to 194° C.

The infrared spectrum (KBr) showed bands at 1,619 cm⁻¹ and 1,594 cm⁻¹ (C = C) and 1,547 cm⁻¹ (C = NCl).

NMR: 5.95 ppm (4–H and 6–H).

Analysis

Calculated for $C_{23}H_{30}ClNO_3$: C:63.39% H:7.49% N: 3.47% O: 11.88% Cl: 8.78%

Found: C:68.09% H:7.65% N:3.43: O: 12.07% Cl: 8.81%

Upon further eluation with benzene 0.28 g of a mixture of the two isomeric forms were obtained and thereafter 2.9 g of the syn-isomeric form which after crystallization from methanol showed a melting point of 190° to 195° C.

The infrared spectrum (KBr) showed bands at 1,611 cm⁻¹ and 1,577 cm⁻¹ (C = C) and 1,536 cm⁻¹ (C = NCl).

NMR: 6.43 ppm (4–H).

Analysis

Found: C: 68.12% H: 7.55% N: 3.37% O: 11.91% Cl: 9.03%

Biology

The compounds showed a strong gestagenic effect without gonadotropin inhibiting properties by oral administration.

EXAMPLE 14

17α-acetoxy-Δ¹,⁴,⁶-pregnatriene-20-one-3-N-chloroimine 11.5 g of 17α-acetoxy-Δ¹,⁴,⁶-pregnatriene-3.2o-dione were dissolved in a mixture of 250 ml of dry methanol and 100.0 ml of a 4.5 molar methanolic methylamine solution and treated as described in Examples 8 and 9 while using 1,000 ml of dry methanol, 40.0 ml of a 7.5 molar methanolic ammonia solution, 57.0 g of the ammonium salt of p-toluenesulfonic acid and 15.5 g of 70 percent calciumhypochlorite solution.

The residue was chromatographed on 500 g of deactivated silica gel, using benzene as eluation agent.

In this manner were obtained 2.3 g of the anti-isomeric form of 17α-acetoxy-Δ¹,⁴,⁶-pregnatriene-20-one-3-N-chloroimine which after recrystallization from methanol showed a melting point of 183° to 186° C.

The infrared spectrum (KBr) showed bands at 1,639 cm⁻¹, 1,582 cm⁻¹ (C = C) and 1,529 cm⁻¹ (C = NCl).

NMR: 6.10 ppm (4–H).

Analysis

Calculated for $C_{23}H_{28}ClNO_3$:

C: 68.73% H: 7.02% N: 3.49% O: 11.94% Cl: 8.82%

Found:

C: 68.88% H: 7.23% N: 3.47% O: 11.65% Cl: 8.81%

Upon further eluation 2.13 g of the syn-isomeric form were obtained. The syn-isomeric form showed after recrystallization from methanol a melting point of 190° to 192° C.

The infrared spectrum (KBr) showed bands at 1,636 cm⁻¹, 1,577 cm⁻¹ (C = C) and 1,521 cm⁻¹ (C = NCl).

NMR: 6.63 ppm (4–H).

EXAMPLE 15

17α-caproyloxy-Δ⁴-pregnene-20-one-3-N-chloroimine 12.0 g of 17α-hydroxy-progesterone caproate were dissolved in a mixture of 300 ml of dry methanol and 50.0 ml of a 7.0 molar methanolic methylamine solution and treated as described in Examples 8 and 9 while using 1,600 ml of dry methanol, 31.0 ml of a 9.0 molar methanolic ammonia solution, 51.5 g of the ammonium salt of p-toluenesulfonic acid and 13.9 g 70 percent calciumhypochlorite solution. The residue was chromatographed on 700 g of deactivated silica gel, using benzene as eluation agent.

In this manner there were obtained 0.75 g of the anti-isomeric form of 17α-caproyloxy-Δ⁴-pregnene-20-one-3-N-chloroimine with a melting point of 82° to 84° C after recrystallization from methanol.

The infrared spectrum (KBr) showed bands at 1,616 cm⁻¹ (C = C), 1,557 cm⁻¹ (C = NCl) and 681 cm⁻¹ (NCl).

Analysis
Calculated for $C_{27}H_{40}ClNO_3$: C: 70.18 % H: 8.73% N: 3.03% O: 10.39% Cl: 7.67
Found: Cl 69.96% H: 8.60% N: 2.97% O: 10.50% Cl: 7.73%

Upon further eluation a mixture of the two isomeric forms were obtained, and finally 1.43 g of the syn-isomeric form with a melting point of 108° to 112° C were obtained.

The infrared spectrum (KBr) showed bands at 1,616 cm⁻¹ (C = C), 1572 cm⁻¹ (C = NCl) and 681 cm⁻¹ (NCl).

Analysis
Found: C: 69.99% H: 8.60% N: 3.01% O: 10.53% Cl: 7.76%

EXAMPLE 16

17α-hydroxy-Δ⁴-pregnene-20-one-3-N-chloromine 20.0 g of 17α-hydroxy-progesterone were dissolved in a mixture of 200 ml of dry methanol and 250 ml of a 4.5 molar methanolic methylamine solution and treated as described in Examples 8 and 9, while using 1,500 ml of dry methanol, 78.0 ml of a 7.5 molar methanolic ammonia solution, 110 g of the ammonium salt of p-toluenesulfonic acid and 29.4 g of 70 percent calciumhypochlorite solution.

The residue was chromatographed on 1000 g of deactivated silica gel, using benzene as eluation agent.

In this manner there were obtained 3.6 g of 17α-hydroxy-Δ⁴-pregnene-20-one-3-N-chloroimine which after recrystallization from ethylacetate showed a melting point of 155° to 160° C.

The infrared spectrum showed bands at 1,625 cm⁻¹, 1,612 cm⁻¹ (C = C), 1,567 cm⁻¹ and 1556 cm⁻¹ (C = NCl).

Analysis
Calculated for $C_{21}H_{30}ClNO_2$: C: 69.31% H: 8.31% N: 3.85% O: 8.79% Cl: 9.74%
Found: C: 69.23% H: 8.30% N: 3.81% O: 8.85% Cl: 9.69%

EXAMPLE 17

Δ⁴-pregnene-20-one-3-N-chloroimine.

20.0 g of progesterone were dissolved in a mixture of 400 ml of dry methanol and 200 ml of a 4.5 molar methanolic methylamine solution and treated as described in Examples 8 and 9 while using 2,000 ml of dry methanol, 82.0 ml of a 7.5 molar methanolic ammonia solution, 116 g of the ammonium salt of p-toluene sulfonic acid and 35.0 g of 70 percent calciumhypochlorite solution. The residue was chromatographed on 1,000 g of deactivated silica gel. Using benzene as eluation agent 2.0 g of Δ⁴-pregene-20-one-3-N-chloroimine were obtained which upon recrystallization from methanol showed a melting point of 139° to 142° C.

The infrared spectrum (KBr) showed bands at 1,623 cm⁻¹ (C = C), 1557 cm⁻¹ (C = NCl) and 684 cm⁻¹ (NCl).

Analysis
Calculated for $C_{12}H_{30}ClNO$: C: 72.49% H: 8.72% N: 4.02% O: 4.95% Cl: 10.19%
Found: C: 72.21% H: 8.65% N: 3.98% O: 5.07% Cl: 10.50%

EXAMPLE 18

Δ⁴,¹⁶-pregnadiene-20-one-3-N-chloroimine 12.1 g of 20-hydroxy-Δ⁴,¹⁶-pregnadiene-3-one were dissolved in a mixture of 250 ml of dry methanol and 100 ml of a 4.5 molar methanolic methylamine solution and treated as described in Examples 8 and 9, while using 1500 ml of dry methanol, 55.0 ml of a 7.0 molar methanolic ammonia solution, 73.0 g of the ammonium salt of p-toluenesulfonic acid and 19.0 g of 70 percent calciumhypochlorite solution.

The infrared spectrum of the residue showed bands at 3,400 cm⁻¹ (OH), 3,040 cm⁻¹ (C = C), 1,611 cm⁻¹ (C = C), 1560 cm⁻¹ (C = NCl) and 680 cm⁻¹ (NCl), characteristic for 20-hydroxy-Δ⁴,¹⁶-pregnadiene-3-N-chloroimine.

The residue was dissolved in a mixture of 300 ml of dry benzene and 50 ml of cyclohexanone, and 15.0 g of aluminium isopropoxide were added. After reflux for 1 hour and cooling water was added, and the benzene phase was separated. The water phase was washed two times with benzene and the combined benzene phases were washed three times with water, dried over $Na_2SO_4$ and evaporated to dryness in vacuo.

The residue was chromatographed on 800 g of deactivated silica gel, using benzene as eluation agent.

In this manner 390 mg of Δ⁴,¹⁶-pregnadiene-20-one-3-N-chloroimine were obtained showing after recrystallization from ethanol a melting point of 160° to 164° C.

The infrared spectrum (KBr) showed bands at 1,661 cm⁻¹ (C = O), 1,622 cm⁻¹ (C = C), 1,582 cm⁻¹ (C = C) and 1,558 cm⁻¹ (C = NCl).

Analysis
Calculated for $C_{21}H_{28}ClNO$: N: 4.05% Cl: 10.25%
Found: N: 3.78% Cl: 9.95%

Examples of additional compounds which may be prepared according to the invention are 17α-acetoxy-Δ⁴-19-norpregnene-20-one-3-N-chloroimine, 17α-acetoxy-Δ⁴,⁶-19-norpregnene-20-one-3-N-chloroimine and 6α-methyl-17α-ethinyl-17β-acetoxy-Δ⁴-estrene-3-N-chloroimine.

EXAMPLE 19

17α-acetoxy-Δ⁴,⁶-19-norpregnadiene-20-one-3-N-chloroimine.

1.1 g of 17α-acetoxy-Δ⁴,⁶-19-norpregnadiene-3,20-dione were dissolved in 50 ml of 3 molar methanolic methylamine and treated as described in Examples 8 and 9 while using 50 ml of dry methanol, 5.3 ml of a 5.8 molar methanolic ammonia solution, 1.64 g of ammonium chloride and 1.6 g of 70 percent calciumhypochlorite.

The residue was chromatographed on 75 g of deactivated silica gel, using benzene as eluation agent.

In this manner there was obtained 0.28 g of the anti-isomeric form of 17α-acetoxy-Δ⁴,⁶-19-norpregnadiene-20-one-3-N-chloroimine which after recrystallization from methanol showed a melting point of 168°–170° C.

The infrared spectrum (KBr) showed bands at 1,624 cm⁻¹, 1,598 cm⁻¹ (C = C) and 1558 cm⁻¹ (C = NCl).

NMR: 6.23 ppm (4–H).

Upon further eluation with benzene 0.07 g of a mixture of the two isomeric forms was obtained and thereafter 0.20 g of the syn-isomeric form which after crystallization from methanol showed a melting point of 240°–245° C.

The ¹, spectrum (KBr) showed bands at 1,613 cm⁻, 1,586 cm⁻¹ (C = C) and 1,550 cm⁻¹ (C = NCl).

NMR: 6.72 ppm (4–H).

EXAMPLE 20

17α-acetoxy-Δ⁴-19-norpregnene-20-one-3-N-chloroimine.

5.0 g of 17α-acetoxy-19-norprogesterone were dissolved in a mixture of 100 ml of dry methanol and 200 ml of a 4.5 molar methanolic methylamine solution and treated as described in Examples 8 and 9 while using 300 ml of dry methanol, 24.5 ml of a 5.8 molar methanolic ammonia solution, 7.4 g of ammonium chloride and 7.15 g of 70 percent calciumhypochlorite.

The residue was chromatographed on 200 g of deactivated silica gel, using benzene as eluation agent.

In this manner there was obtained 17α-acetoxy-Δ⁴-19-norpregnene-20-one-3-N-chloroimine which after recrystallization from methanol showed a melting point of 165°–170° C.

The infrared spectrum (KBr) showed bands at 1,633 cm⁻¹ (C = C) and 1,566 cm⁻¹ (C = NCl).

NMR: 6.19 ppm (4–H).

What we claim is:

1. Steroid compounds having the general formula:

15

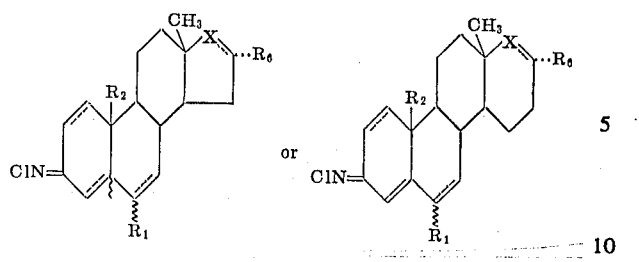

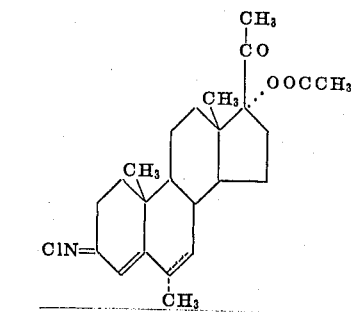

in which the dotted lines in the first formula indicate the presence of an optional double bond in the 4-, 6-, and 16-position, respectively, and the dotted lines in the second formula indicate the presence of an optional double bond in the 1- -b 6-, and 16-position, respectively, and in which R$_1$ means hydrogen, methyl or chlorine,
R$_2$ means hydrogen or methyl,

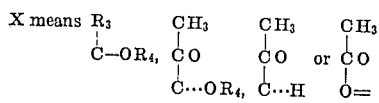

where R$_3$ means hydrogen, an alkyl group with one to six carbon atoms or an alkenyl or alkinyl group having up to five carbon atoms, and R$_4$ means hydrogen or OCR$_5$, wherein R$_5$ is hydrogen or an alkyl group having up to eight carbon atoms, and R$_6$ means hydrogen or alkyl having one to three carbon atoms.

2. Steroid compounds as claimed in claim 1 having the formula:

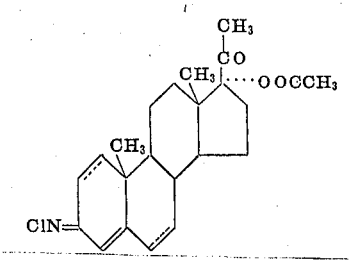

in which the dotted lines indicate the presence of an optional bond in the 1-position and the 6-position, respectively.

3. Steroid compounds as claimed in claim 1 having the formula:

in which the dotted line indicates the presence of an optional bond in the 6-position.

4. 17 α-acetoxy-Δ$^4$-pregnene-20-one-3-N-chloroimine.
5. 17 α-acetoxy-Δ$^{4,6}$-pregnadiene-20-one-3-N-chloroimine.

6. A process for the preparation of steroid compounds of the estrane, androstane, pregnane or 19-norpregnane series having the partial ring A configuration:

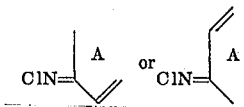

which comprises reacting a corresponding steroid compound of the partial ring A configuration:

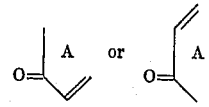

with a primary amine of the formula RNH$_2$, in which R is preferably an alkyl group, a cycloalkyl group or an aralkyl group, to form the corresponding 3-R-imino steroid which is then reacted with ammonia and a hypochlorite or chloramine or N-chlorosuccinimide, the reaction being carried out in an organic solvent, preferably also in the presence of an ammonium salt.

7. A process for the preparation of steroid compounds of the estrane, androstane, pregnane or 19-norpregnane series having the partial ring A configuration:

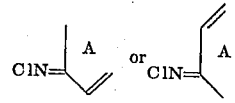

which comprises reacting a corresponding steroid compound of the partial ring A configuration:

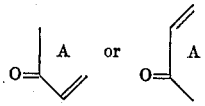

with ammonia and a hypochlorite or freshly prepared chloramine or N-chlorosuccinimide, the reaction being carried out in the presence of an organic solvent, preferably also in the presence of an ammonium salt.

* * * * *

UNITED STATES PATENT OFFICE
CERTIFICATE OF CORRECTION

Patent No. 3,673,224　　　　　　　Dated June 27, 1972

Inventor(s) Poul Borrevang et al

It is certified that error appears in the above-identified patent and that said Letters Patent are hereby corrected as shown below:

In several of the structural diagrams it is not clear from the printed patent whether a dotted line (optional) bond was being shown or solid line bond thus:

At Column 1, line 20, optional (dotted line) double bonds should be shown in the 1- position of the left hand A ring and in the 4- position of the right hand A ring.

At Column 1, line 40, a double bond (solid line) should be shown in the 1- position of the left hand A ring.

At Column 1, line 40, the right hand D ring should be a five-membered ring rather than the six-membered ring shown.

At Column 1, line 55, the formula

FORM PO-1050 (10-69)

UNITED STATES PATENT OFFICE
CERTIFICATE OF CORRECTION

Patent No. 3,673,224 (Cont'd)     Dated June 27, 1972

Inventor(s) Pøul Borrevang et al     PAGE 2

It is certified that error appears in the above-identified patent and that said Letters Patent are hereby corrected as shown below:

At Column 3, line 50, the right hand position of the equation should be changed to read:

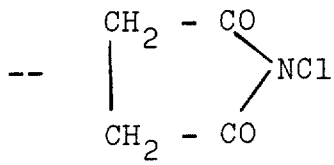   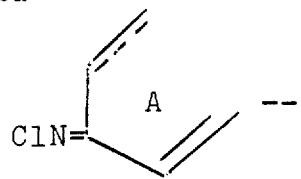

At Column 3, line 75, an optional (dotted line) double bond should be shown in the 1- position of the left hand A ring.

At Column 9, line 65, "Cl:l: 8.48%" should read --Cl: 8.48%--

At Column 9, line 74, delete "8.40%" (second occurence).

At Column 12, line 18, "63.39%" should read --68.39%--

At Column 13, line 12, "Cl" (first occurence) should read --C:--

At Column 13, line 62, "$C_{12}H_{30}ClNO$" should read --$C_{21}H_{30}ClNO$--

At Column 13, line 63, "4.95%" should read --4.59%--

UNITED STATES PATENT OFFICE
CERTIFICATE OF CORRECTION

Patent No. 3,673,224 (Cont'd)     Dated June 27, 1972

PAGE 3

Inventor(s) Pøul Borrevang et al

It is certified that error appears in the above-identified patent and that said Letters Patent are hereby corrected as shown below:

At Column 15, line 5, a (solid line) double bond should be shown in the 1- position of the left hand A ring.

At Column 15, line 5 the right hand D ring should be a five-membered ring rather than the six-membered ring shown.

At Column 15, line 18, "1- -b" should read --1,--

At Column 15, line 25 the formula:

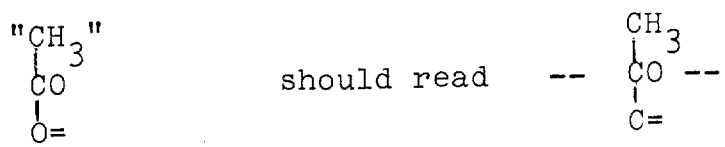

Signed and sealed this 15th day of May 1973.

(SEAL)
Attest:

EDWARD M. FLETCHER, JR.
Attesting Officer

ROBERT GOTTSCHALK
Commissioner of Patents